(12) United States Patent
Dowty et al.

(10) Patent No.: US 12,103,686 B2
(45) Date of Patent: Oct. 1, 2024

(54) MOVABLE AREA PARTITION

(71) Applicant: B/E AEROSPACE, INC., Winston Salem, NC (US)

(72) Inventors: Mark B. Dowty, Rural Hall, NC (US); Troy G. Perry, Saratoga Springs, UT (US)

(73) Assignee: B/E AEROSPACE, INC., Winston Salem, NC (US)

( * ) Notice: Subject to any disclaimer, the term of this patent is extended or adjusted under 35 U.S.C. 154(b) by 0 days.

(21) Appl. No.: 17/843,525

(22) Filed: Jun. 17, 2022

(65) Prior Publication Data
US 2023/0406506 A1  Dec. 21, 2023

(51) Int. Cl.
*B64D 11/00* (2006.01)
*B64D 11/04* (2006.01)
*B64D 11/06* (2006.01)

(52) U.S. Cl.
CPC .......... *B64D 11/0023* (2013.01); *B64D 11/04* (2013.01); *B64D 11/0601* (2014.12)

(58) Field of Classification Search
CPC ............... B64D 11/0023; B64D 11/04; B64D 2011/0046; B64C 1/1407; E05B 59/00
See application file for complete search history.

(56) References Cited

U.S. PATENT DOCUMENTS

| | | | | | |
|---|---|---|---|---|---|
| 2,274,216 A | * | 2/1942 | Sanders | ................ | E05D 15/262 |
| | | | | | 160/207 |
| 2,396,039 A | * | 3/1946 | Graves | .................. | B64D 11/00 |
| | | | | | 296/63 |
| 2,868,407 A | * | 1/1959 | Woodcock | ........... | B65D 88/524 |
| | | | | | 220/7 |
| 3,398,850 A | * | 8/1968 | Kennard | ............... | E04B 1/3445 |
| | | | | | 217/14 |
| 3,423,121 A | * | 1/1969 | Lipkin | ............... | B64D 11/0023 |
| | | | | | 160/35 |
| 3,768,855 A | * | 10/1973 | Laue | ..................... | E04B 1/3442 |
| | | | | | 296/26.02 |
| 4,588,223 A | * | 5/1986 | Ledenyi | .................. | B60R 21/12 |
| | | | | | 160/84.06 |

(Continued)

FOREIGN PATENT DOCUMENTS

| DE | 10322611 | 8/2004 |
|---|---|---|
| EP | 1106502 | 3/2006 |

(Continued)

OTHER PUBLICATIONS

European Patent Office, European Search Report dated Nov. 16, 2023 in Application No. 23179417.3.

*Primary Examiner* — Joshua J Michener
*Assistant Examiner* — Cindi M Curry
(74) *Attorney, Agent, or Firm* — SNELL & WILMER L.L.P.

(57) ABSTRACT

A movable area partition is disclosed herein. The movable area partition includes a bottom pivot point, a top pivot point, a first panel having a first end and an opposing second end, the first end of the first panel pivotably coupled to the bottom pivot point, and a second panel having a first end an opposing second end, the first end of the second panel rotatably coupled to the second end of the first panel and the second end of the second panel pivotably coupled to the top pivot point.

20 Claims, 10 Drawing Sheets

(56) References Cited

U.S. PATENT DOCUMENTS

| | | | | |
|---|---|---|---|---|
| 5,005,629 | A * | 4/1991 | Caillet | E06B 3/01 |
| | | | | 160/35 |
| 5,110,164 | A * | 5/1992 | Whiteman | E05B 83/10 |
| | | | | 292/7 |
| 5,371,982 | A * | 12/1994 | Douglas | E01F 7/00 |
| | | | | 52/64 |
| 5,509,700 | A * | 4/1996 | Kennedy, Jr. | E05B 17/0058 |
| | | | | 292/DIG. 32 |
| 5,876,064 | A * | 3/1999 | Ament | B60R 21/06 |
| | | | | 280/749 |
| 6,257,523 | B1 * | 7/2001 | Olliges | B61D 17/048 |
| | | | | 244/129.5 |
| 8,517,307 | B2 | 8/2013 | Saint-Jalmes et al. | |
| 8,857,496 | B2 * | 10/2014 | Raniere | E04B 2/7405 |
| | | | | 52/239 |
| 10,358,173 | B2 * | 7/2019 | Gussen | B62D 33/042 |
| 10,399,681 | B2 | 9/2019 | Seibt et al. | |
| 10,597,160 | B2 * | 3/2020 | Schliwa | B64C 1/18 |
| 11,591,090 | B2 * | 2/2023 | Bonnefoy | B64D 11/0023 |
| 2003/0127562 | A1 * | 7/2003 | Pereira | B64C 1/1469 |
| | | | | 244/118.5 |
| 2017/0267353 | A1 | 9/2017 | McIntosh et al. | |
| 2019/0329891 | A1 * | 10/2019 | Bonnefoy | B64D 11/0023 |
| 2023/0068954 | A1 * | 3/2023 | Vermeulen | B64D 11/0007 |

FOREIGN PATENT DOCUMENTS

| | | |
|---|---|---|
| WO | 9301088 | 1/1993 |
| WO | 2019068028 | 4/2019 |

* cited by examiner

MOVABLE AREA PARTITION

FIELD

The present disclosure generally relates to a movable area partition, and more specifically, to a movable area partition within an aircraft.

BACKGROUND

Generally, aircraft interiors are divided into different areas including different types of seating and catering areas, or galleys. Larger aircraft, such as wide body, twin aisle aircraft, generally have a galley between the two aisles and the between different sets of seating. Partitions are used to separate the seating areas from the galleys to provide a place for flight crew to work and to separate the galley from the seating areas. The distance between the seats and the partitions are regulated in part by head injury criteria established by the Federal Aviation Administration (FAA), among other agencies and organizations. The distance requirements specify clearance requirements between seating and partitions to reduce to likelihood of head injury or death in the event of an emergency. The distance requirements further provided different distances of taxi, take off, and landing than those during flight.

SUMMARY

A movable area partition is disclosed herein. The movable area partition includes a bottom pivot point, a top pivot point, a first panel having a first end and an opposing second end, the first end of the first panel pivotably coupled to the bottom pivot point, and a second panel having a first end an opposing second end, the first end of the second panel rotatably coupled to the second end of the first panel and the second end of the second panel pivotably coupled to the top pivot point.

In various embodiments, the first panel and the second panel rotate from a first position to a second position that is different than the first position. In various embodiments, the movable area partition further includes a locking mechanism including an upper locking pin, the upper locking pin configured to extend from within the first panel and into the second panel to lock first panel and the second panel in a first position.

In various embodiments, the movable area partition further includes a third panel having a first end and an opposing second end, first end of the third panel rotatably coupled to the second end of the first panel and the second end of the third panel rotatably coupled to the first end of the second panel. In various embodiments, the movable area partition further includes a locking mechanism including an upper locking pin and a lower locking pin, the locking mechanism disposed within the third panel, the upper locking pin configured to extend from the third panel into the second panel to lock the movable area partition in a first position. In various embodiments, the lower locking pin is configured to extend from the third panel into the first panel to lock the movable area partition in a second position that is different than the first position. In various embodiments, the third panel and the second panel are colinear when locked in the first position.

Also disclosed herein is an aircraft including a galley, a seat, and a movable partition disposed between the galley and the seat. The movable partition includes a bottom pivot point, a top pivot point, a first panel having a first end and an opposing second end, the first end coupled to the bottom pivot point, and a second panel having a first end and an opposing second end, the first end of the second panel coupled to the second end of the first panel, the second end of the second panel coupled to the top pivot point.

In various embodiments, the aircraft further includes a floor anchor, wherein the bottom pivot point is coupled to the floor anchor. In various embodiments, the top pivot point is coupled to the ceiling anchor. In various embodiments, the movable partition further includes a third panel disposed between the first panel and the second panel, the third panel coupled to the first panel and the second panel. In various embodiments, the movable partition is configured to move to a first position, the second panel and the third panel being colinear in the first position.

In various embodiments, the movable partition is further configured to move from the first position to a second position, the first panel and the third panel being colinear in the second position. In various embodiments, the aircraft further includes a locking mechanism disposed within the third panel where the locking mechanism includes an upper locking pin, a lower locking pin, and a rod connected to the upper locking pin at a first end and the lower locking pin at an opposing second end. In various embodiments, the upper locking pin extends into the second panel in response to the rod moving in a first direction. In various embodiments, the lower locking pin extends into the first panel in response to the rod moving in a second direction that is opposite the first direction. In various embodiments, the locking mechanism further includes a handle configured to move the rod in the first direction and the second direction.

Also disclosed herein is a movable partition including a bottom panel pivotable about a bottom pivot point, a top panel pivotable about a top pivot point, and a middle panel having a first end and an opposing second end, the first end of the middle panel rotatably coupled to the bottom panel and the second end of the middle panel rotatably coupled to the top panel.

In various embodiments, the movable partition further includes a locking mechanism disposed within the middle panel, the locking mechanism including a first locking pin configured to extend from the middle panel into the top panel in response to the middle panel and the top panel being colinear. In various embodiments, the locking mechanism further includes a second locking pin configured to extend from the middle panel into the bottom panel in response to the middle panel the bottom panel being colinear.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1A:
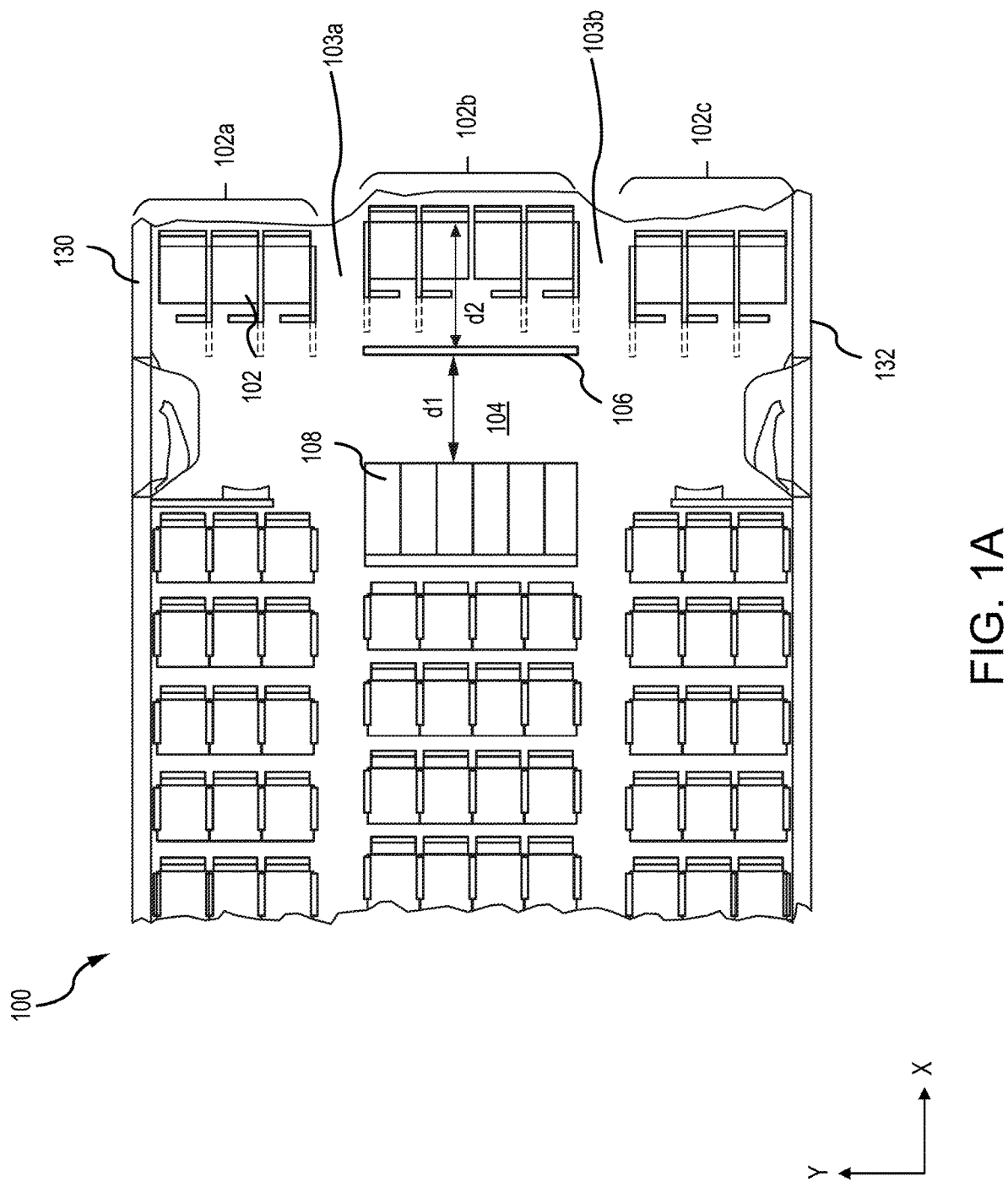
FIGS. 1A and 1B illustrate an aircraft interior layout, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a moving partition that intrudes into a galley, or similar area, during taxi, take off, and landing (TTL), but can be repositioned to an in-flight mode that restores the cart ingress/egress space and catering space during flight operations. The use of the movable partition, in various embodiments, provides about 7 inches (17.8 cm) to about 8 inches (20.3 cm) additional space within the aircraft cabin. The additional space may be used, in various embodiments, to provide additional leg space for each seat, to upgrade to larger seating, or to move seating closer to the galley, among other configurations that may be used as part of an overall aircraft cabin optimization effort.

The novel partitions disclosed herein, in various embodiments, use a series of panels that, when joined together, use rotational motion around pivots at each joint to move from a TTL position to an in-flight position in a way that the attachments to the aircraft remain stationary. The partition, in various embodiments, may be moved from the TTL position to the in-flight position and back by releasing a latch and manually rotating the panels. In various embodiments, the top two panels are colinear when in the TTL position and the bottom two panels are colinear when in the in-flight position. The partition, when in the TTL position, satisfies regulatory head injury requirements set by different agencies, such as the Federal Aviation Administration (FAA). The partitions, when in the TTL position, satisfy the larger distance requirements of the FAA, among others, while also satisfying the shorter distance requirements when placed in the in-flight position.

Additionally or in the alternative, the partition are attached to the floor of the aircraft and overhead. In various embodiments, the partition may move from the TTL position to the in-flight position, and back, by pivoting about the floor attachment and the overhead attachment. In various embodiments, the top attachment may translate laterally along a track and/or pivot about an intermediate hinge to meet head injury criteria clearances.

Figure 1B:
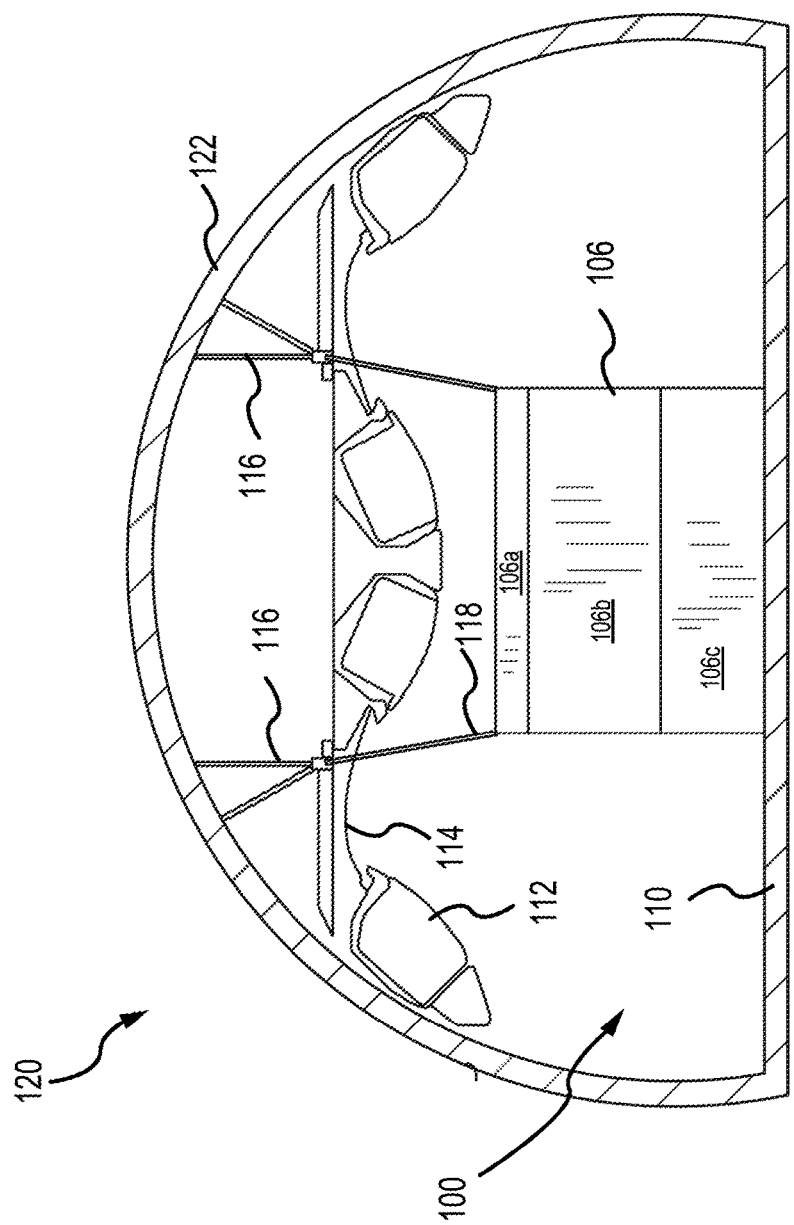

Referring now to FIGS. 1A and 1, in accordance with various embodiments, an aircraft interior 100 is illustrated. FIG. 1A illustrates on overhead view (e.g., the z-axis) of a seating arrangement, or layout of passenger accommodations, within aircraft interior 100. FIG. 1B illustrates a cross section view of aircraft interior 100.

As depicted in FIG. 1A, aircraft interior 100 includes seats 102, an aisle 103a, an aisle 103b, a cross aisle 104, a partition 106 separating seats 102, and cart storage 108. Seats 102 are placed in rows and sections with a first section 102a being between aisle 103a and an exterior wall 130 of an aircraft 120, second section 102b being between aisle 103a and aisle 103b, and a third section 102c being between aisle 103b and an exterior wall 132 of aircraft 120. Partition 106 is depicted as extending between aisle 103a and aisle 103b. In various embodiments, another partition 106 in front of first section 102a and/or second section 102b. In various embodiments, partition 106 may be placed in other locations of aircraft interior 100, such as between seats 102 and a bathroom, among others. Cart storage 108 may be part of an aircraft galley and located adjacent cross aisle 104.

There is a distance d1 between cart storage 108 and partition 106 (e.g., in the x-axis). In conventional aircraft interior 100, distance d1 is about 37 inches (94 cm) to about 40 inches (101.6 cm). However, distance d1 may be about 20 inches (50.8 cm) to about 40 inches (101.6 cm). In various embodiments, distance d1 may be larger or smaller. Aircraft interior 100 may provide for a minimum of 20 inches (50.8 cm) during taxi, take off, and landing (TTL) and a minimum of 35 inches (88.9 cm) while in-flight to allow a full size cart to be extracted from cart storage 108. In various embodiments, different aircraft interiors 100 may have different minimum distances for distance d1 based on the type of cart used (e.g., full size cart, half-size cart, stacked carts, etc.) When partition 106, as disclosed herein in various embodiments, is used, distance d1 may be about 29 inches (73.6 cm) to about 32 inches (81.3 cm) during TTL. A distance of about 35 inches (88.9 cm) to about 40 inches (101.6 cm) may be used to remove a catering cart from cart storage 108. There is a distance d2 between partition 106, or anything mounted on partition 106, and seats 102 (e.g., in the x-axis) and more specifically between partition 106 and a seat reference point (e.g., the back cushion of seat 102). In various embodiments, a cushion reference point may be used, where the cushion reference point is the intersection of the back cushion and bottom cushion of seat 102. Distance d2 may be about 35 inches (88.9 cm) to about 50 inches (127.0 cm), and more specifically, about 35 inches (88.9 cm) to about 43 inches (109.2 cm) to meet regulatory distances. For example, for safety distance d2 be at least 43 inches (109.2 cm) during TTL and at least 35 inches (88.9 cm) while in-flight, as measured by the seat reference point or the cushion reference point.

As depicted in FIG. 1B, a cross section (e.g., along the x-axis) of an aircraft 120 includes an airframe 122, aircraft interior 100, partition 106, a floor 110, overhead storage 112, a ceiling 114, and ceiling supports 116. Partition 106 is further depicted, in accordance with various embodiments, as including three panels, a top panel 106a, a middle panel 106b, and a bottom panel 106c. Partition 106 separates seats 102 from galley 104. In the depicted embodiment, partition 106 does not extend to ceiling 114, allowing access to overhead storage 112. In various embodiments, where overhead storage 112 is not present above partition 106, partition 106 may extend to ceiling 114. Top panel 106a may be pivotably coupled to ceiling supports 116 suing partition supports 118. Partition supports 118 provide a stable upper support for partition 106 and can be bolted to any height within aircraft 120. Generally, ceiling supports 116 are present in aircraft 120 for attaching interior features such as ceiling 114, overhead storage 112, among others. Coupling partition 106 to already existing ceiling supports 116 provides an easier path to retrofit aircraft 120 to include partition 106. Bottom panel 106c may be pivotably coupled to floor 110, providing a stable lower support for partition 106. Generally, floor attachments are present in aircraft 120 and may include seat tracks for installing seats 102 or other anchors for attaching interior furnishings to aircraft interior 100. In various embodiments, magazine holders, inflight entertainment (e.g., tv screens), or other amenities may be mounted to partition 106.

Figure 2A:
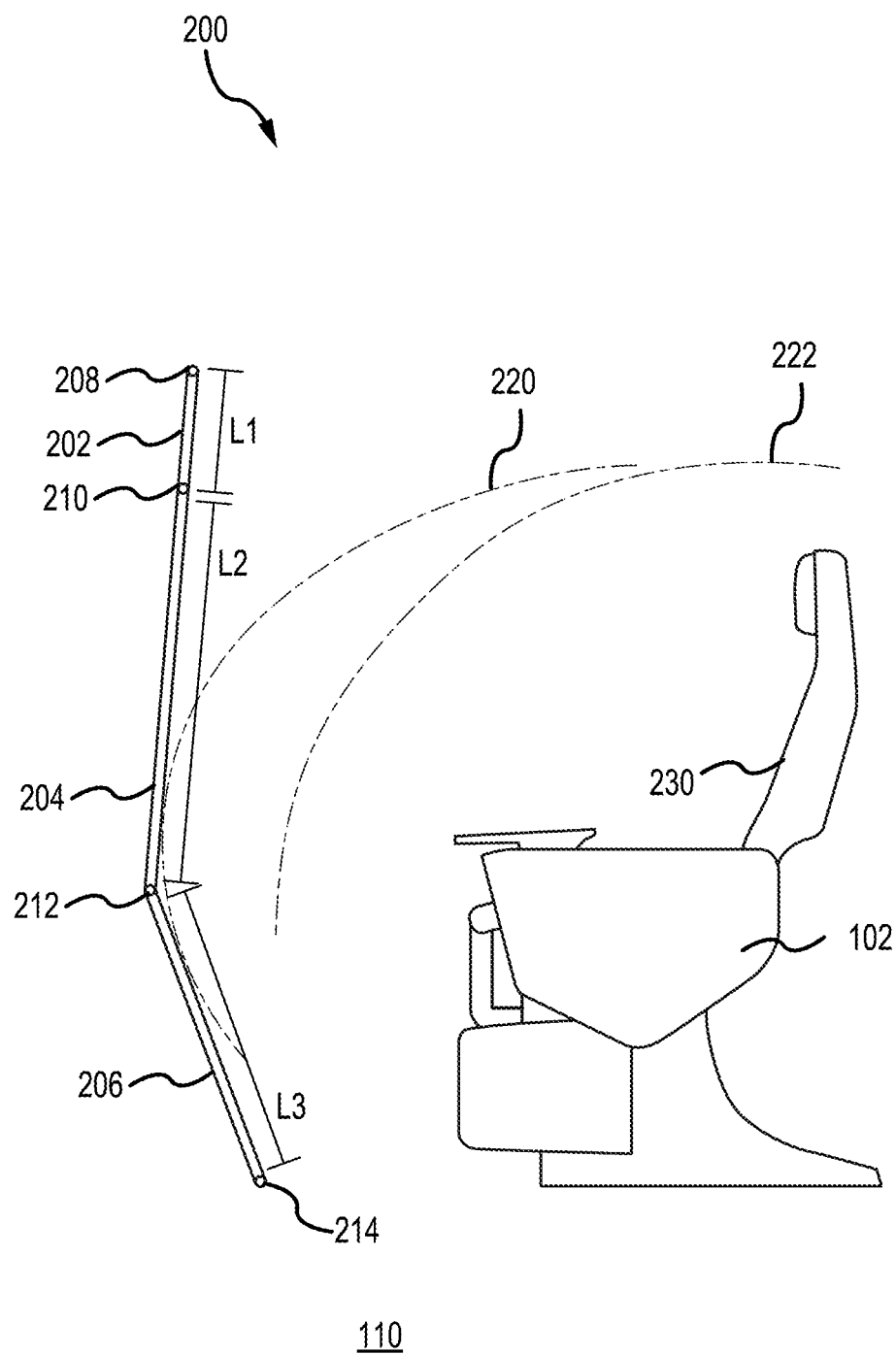
FIGS. 2A and 2B illustrate a movable area partition, in accordance with various embodiments.
Figure 2B:
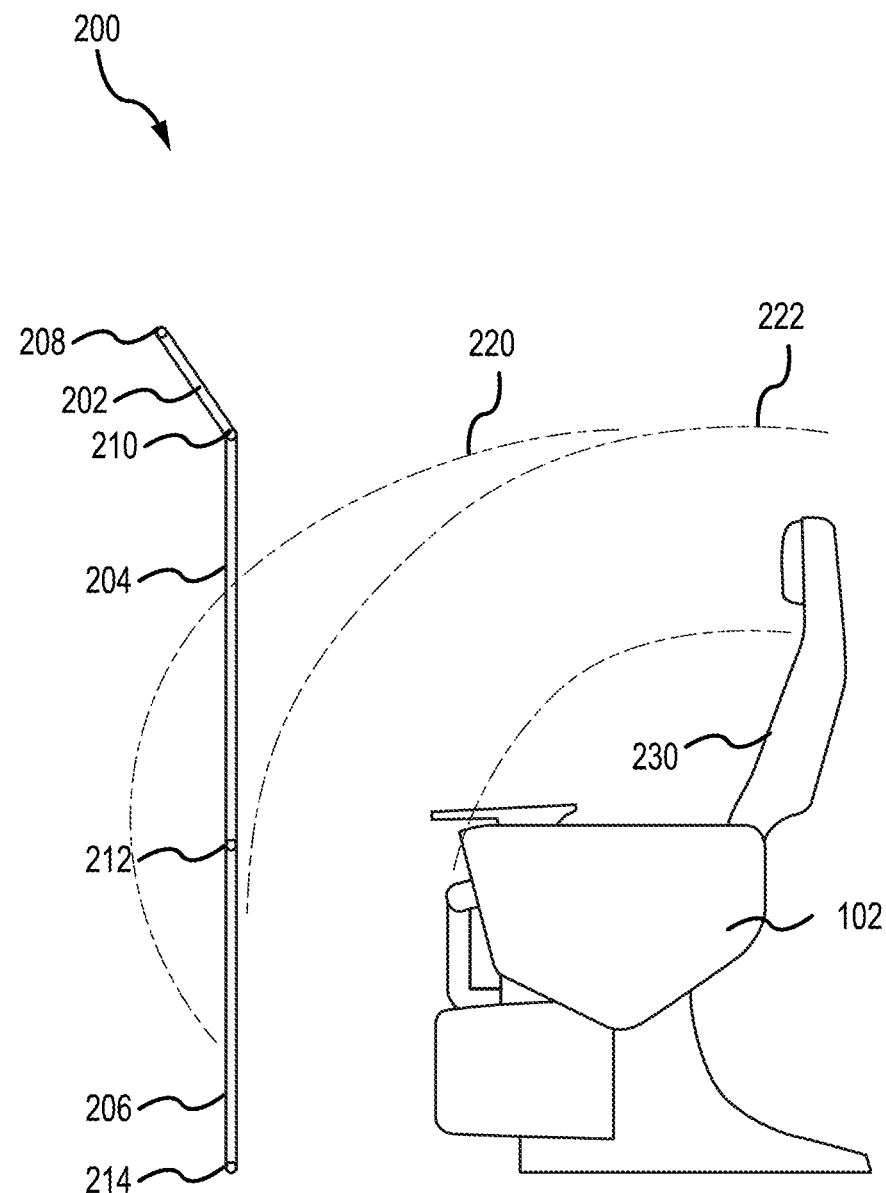
Figure 2B:
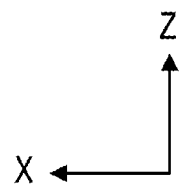

Referring now to FIGS. 2A and 2B, in accordance with various embodiments, a movable partition 200 is illustrated. Movable partition 200 may be an example of partition 106 described above with respect to FIGS. 1A and 1B. FIG. 2A illustrates a side view of movable partition 200 in the taxi, take off, and landing (TTL) position and FIG. 2B illustrates a side view of movable partition 200 in the in-flight position.

Movable partition 200 includes three panels, a top panel 202, a middle panel 204, and a bottom panel 206. Movable partition 200 further includes a connector 208, a connector 210 a connector 212, and a connector 214. Connector 208 connects top panel 202 to aircraft 120, and more specifically, to partition supports 118. In various embodiments, connector 208 provides a pivot point about which top panel 202 may pivot, or swing, as it transitions from the TTL position to the inflight position. In various embodiments connector 208 may be a ball and socket join, a condyloid join, a saddle join, a hinge join, a pivot join, a knuckle joint, a clevis joint, or any other connection that allows top panel 202 to swing (e.g., in the x-axis) as it transitions from the TTL position to the in-flight position. Connector 210 connects top panel 202 to middle panel 204 allowing top panel 202 and middle panel 204 to rotate with respect to each other. In various embodiments, connector 210 may be a hinge and pin, or piano hinge connector, among others. Connector 212 connects middle panel 204 to bottom panel 206 allowing middle panel 204 and bottom panel 206 to rotate with respect to each other. Connector 212 may be the same type of connector as connector 210. Connector 214 connects bottom panel 206 to floor 110 of aircraft 120. Connector 212 provides a stable connection point about with bottom panel 206 can rotate, pivot, or swing (e.g., in the x-axis). In the illustrated embodiment, connector 208 is longitudinally offset (e.g., in the x-direction) with respect to connector 214 such that connector 208 and connector 214 are not in the same vertical (e.g., in the z-axis) plane. In various embodiments, the longitudinal offset between connector 208 and connector 214 may be about 3 inches (7.6 cm) to about 10 inches (25.4 cm). In various embodiments, connector 208 is not longitudinally offset with respect to connector 214 (e.g., they are in the same vertical plane (e.g., the z-axis).

FIG. 2A further includes TTL head strike arc 220 and in-flight limiting arc 222. In flight limiting arc 222 defines an arc within which components must be delethalized, or in other words, not be fatal to a passenger should the passenger's head collide with the component while in flight. TTL head strike arc 220 illustrates the regulatory distance of a passenger's head between seat 102 and movable partition 200 during TTL. This may be an example of distance d2 during TTL described above with respect to FIG. 1A. TTL head strike arc 220 may be about 43 inches (109.2 cm) from the seat reference point (SRP) (e.g., a backrest 230) of seat 102. TTL head strike arc 220 may be based on the 50th percentile height and may be referred as the 50th percentile head strike arc. In-flight limiting arc 222 may be about 35 inches (88.9 cm) from backrest (CRP) 230, or a cushion reference point, of seat 102. The cushion reference point of seat 102 is the intersection of backrest 230 and bottom, or seat cushion, of seat 102. To meet regulatory requirements, TTL head strike arc 220 may not contact movable partition 200, or anything mounted to movable partition 200, during TTL and in-flight limiting arc 222 may not contact movable partition 200, or anything mounted to movable partition 200, while in flight. More specifically, in-flight limiting arc 222 is a delethalization arc, that is, should a passenger hit movable partition 200, or a component mounted to movable partition 200, the passenger should not suffer significant injury from the impact.

In the depicted embodiment of FIG. 2A, TTL head strike arc 220 does not contact movable partition 200 in the TTL position because movable partition 200 is moved outside of TTL head strike arc 220 during TTL. As illustrated, when moved outside of TTL head strike arc 220 for TTL, top panel 202 and middle panel 204 are colinear while middle panel 204 and bottom panel 206 are not colinear. That is, there is a straight line between connector 208 and connector 212 through top panel 202 and middle panel 204 and middle panel 204 is at an angle with respect to bottom panel 206. When in the TTL position, movable partition 200 reduces the amount of available space in cross aisle 104 while increasing the amount of available space in front of seat 102.

Referring now to FIG. 2B, movable partition 200 is illustrated in the in-flight position, according to various embodiments. When movable partition 200 is in the in-flight position, TTL head strike arc 220 may contact movable partition 200. However, in-flight limiting arc 222 does not contact movable partition 200. In the in-flight position, as depicted, middle panel 204 and bottom panel 206 are colinear while top panel 202 and middle panel 204 are not colinear. In various embodiments, middle panel 204 and bottom panel 206 may not be colinear in the in-flight position. That is, there is a straight line between connector 210 and connector 214 through middle panel 204 and bottom panel 206 and top panel 202 is at an angle with respect to middle panel 204. When in the in-flight position, movable partition 200 increases the amount of available space in galley 104 while reducing the amount of available space in front of seat 102.

In the depicted embodiment of FIGS. 2A and 2B, top panel 202, middle panel 204, and bottom panel 206 are straight panels, that is, extending in a straight line between each connection point. In various embodiments, one or more of top panel 202, middle panel 204, and bottom panel 206 may include a curve, be curved, include multiple angled faces, or otherwise manufactured to include an orientation other than straight. Straight, flat panels are more economical to manufacture and easier to install. However, any shape or feature is possible to be included on one or more of top panel 202, middle panel 204, and bottom panel 206 so long as the regulatory distance for the TTL position and in-flight position are met.

Top panel 202 has a length L1, middle panel 204 has a length L2, and bottom panel 206 has a length L3. Length L1 may be about 6 inches (15.2 cm) to about 24 inches (60.9 cm). Length L2 may be about 12 inches (30.5 cm) to about 48 inches (121.9 cm). Length L3 may be about 12 inches (30.5 cm) to about 36 inches (91.4 cm). The length of each panel, 202, 204, 206, is variable based on the desired design and aesthetic of movable partition 200. When top panel 202, middle panel 204, and/or bottom panel 206 are curved the lengths of each panel are more configurable and may be outside the ranges previously mentioned. While various examples are provided above, it should be understood that the dimensions of movable partition 200 are highly configurable and may be larger or smaller than those provided above in various installations.

Movable partition 200 may be moved from the TTL position to the in-flight position manually, mechanically, or electrically using a motor. When moving between the TTL position and the in-flight position, top panel 202, middle panel 204, and bottom panel 206 may move and/or rotate independently of each other. In various embodiments, movable partition 200 includes a locking mechanism to secure movable partition 200 in either the TTL position or the in-flight position.

Figure 3A:
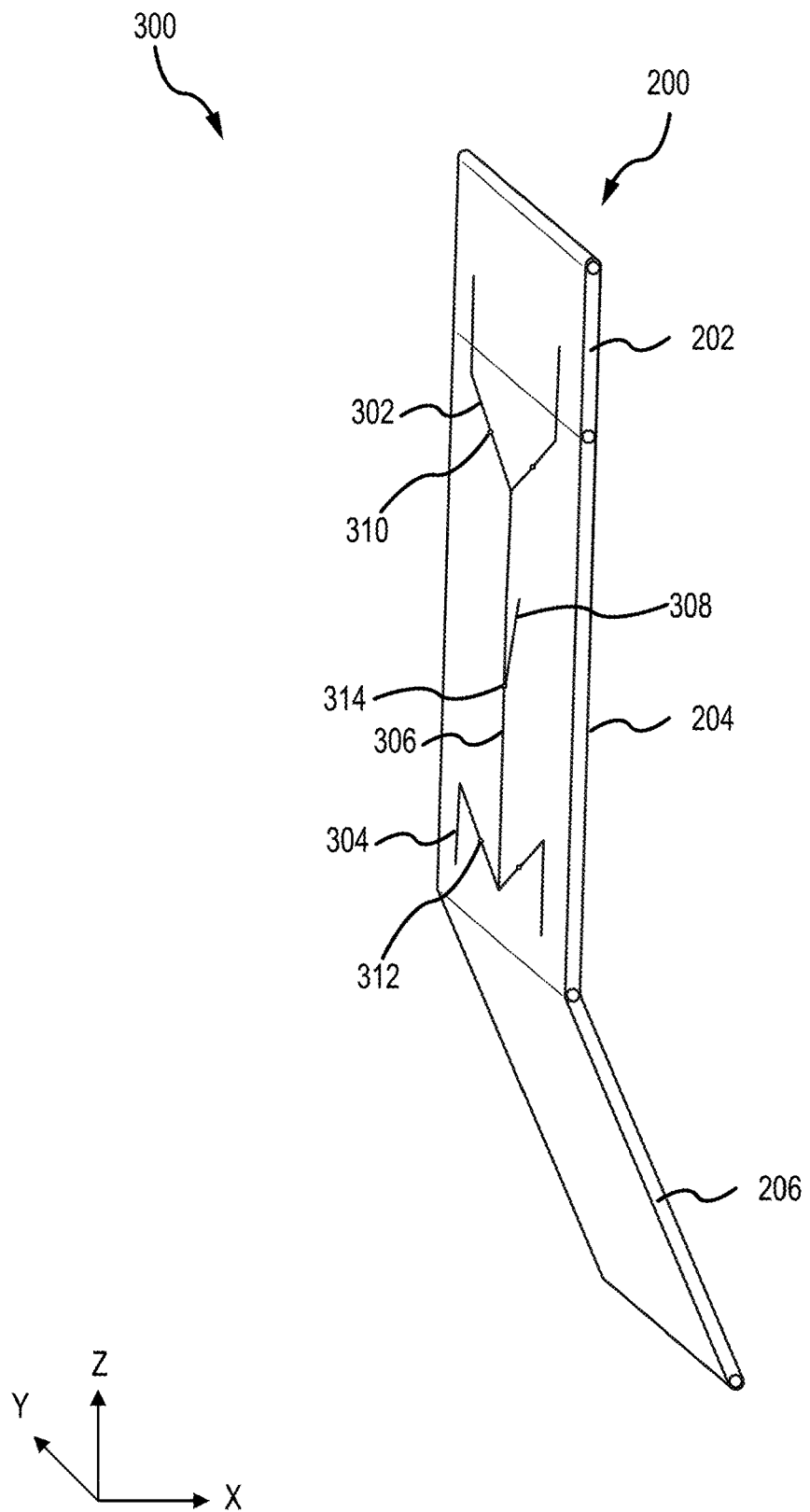
FIGS. 3A and 3B illustrate a locking mechanism used with a movable area partition, in accordance with various embodiments.
Figure 3B:
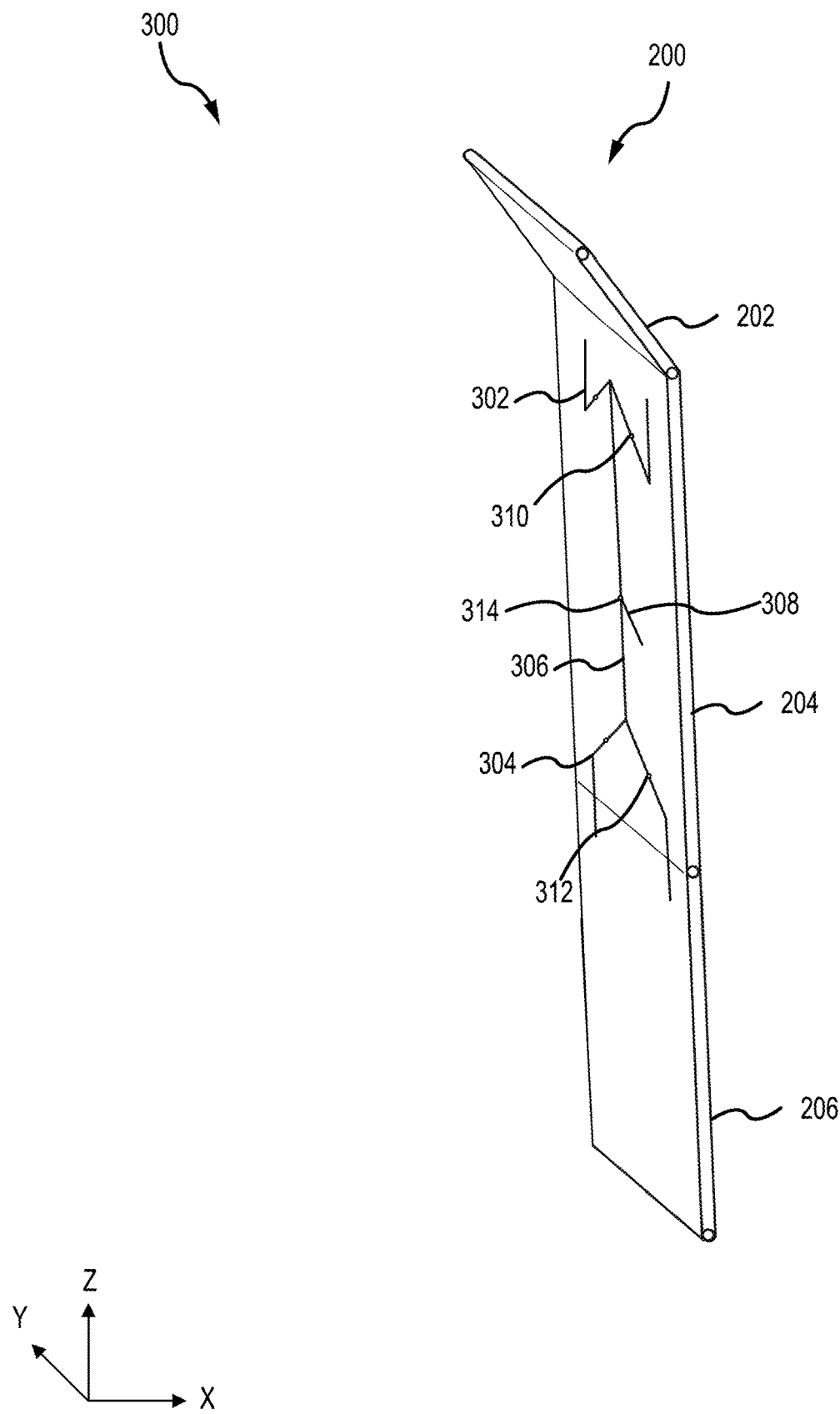

Referring now to FIGS. 3A and 3B, in accordance with various embodiments, a locking mechanism 300 is illustrated with respect to movable partition 200. FIG. 3A is a perspective view of movable partition 200 in the taxi, take off, and landing (TTL) position and locking mechanism 300 in a TTL locked position. FIG. 3B is a perspective view movable partition 200 in the in-flight position and locking mechanism in an in-flight locked position. Locking mechanism 300 is internal to movable partition 200 but for simplicity and ease of discussion locking mechanism 300 is depicted as solid lines.

Locking mechanism include upper locking pins 302, lower locking pins 304, a connector rod 306, and a handle 308. Handle 308 may be used to manually operate locking mechanism 300. In various embodiments, handle 308 may be a knob, a wheel, or other rotational mechanism. In various embodiments, locking mechanism 300 may be operated by a motor or other mechanical means and handle 308 may be removed. Upper locking pins 302, lower locking pins 304, and connector rod 306 may be made from metal, plastic, composite, or other materials. Upper locking pins 302, lower locking pins 304, and connector rod 306 may be tubes, rods, pins, or other structures. In various embodiments, upper locking pins 302 and lower locking pins 304 may be actuated using one or more solenoids without the use of connector rod 306. In various embodiments, other configurations including more locking pins are contemplated.

In various embodiments, middle panel 204 may be hollow providing space for locking mechanism 300. In various embodiments, middle panel 204 may be solid and include a space therein that allows for travel of connector rod 306, upper locking pins 302, and lower locking pins 304. Top panel 202 and bottom panel 206 may include holes that receive upper locking pins 302 and lower locking pins 304, respectively. When locking mechanism is in the TTL locked position, as illustrated in FIG. 3A, upper locking pins 302 extend upward (e.g., the z-direction) from within middle panel 204 and into top panel 202, lower locking pins 304 are retracted upward (e.g., the z-direction) from bottom panel 206 and into middle panel 204, and handle 308 is in an up position. When locking mechanism is in the in-flight locked position, as illustrated in FIG. 3B, upper locking pins 302 are retracted downward (e.g., the negative z-direction) from top panel 202 and into middle panel 204, lower locking pins 304 extend downward (e.g., the negative z-direction) and into bottom panel 206, and handle 308 is in a down position.

Locking mechanism 300 further includes pivot points 310 for upper locking pins 302, pivot points 312 for lower locking pins 304, and a pivot point 314 for handle 308. Handle 308 pivots about pivot point 314 when moving from the up position to the down position. Upper locking pins 302 pivot about pivot points 310 when extending and retracting. Lower locking pins 304 pivot about pivot points 312 when extending and retracting. When handle 308 is in a neutral position (e.g., horizontal in the y-axis), upper locking pins 302 are retracted downward (e.g., the negative z-direction) and lower locking pins 304 are retracted upward (e.g., the z-direction). This allows movable partition 200 to move freely between the TTL position and the in-flight position.

Figure 4A:
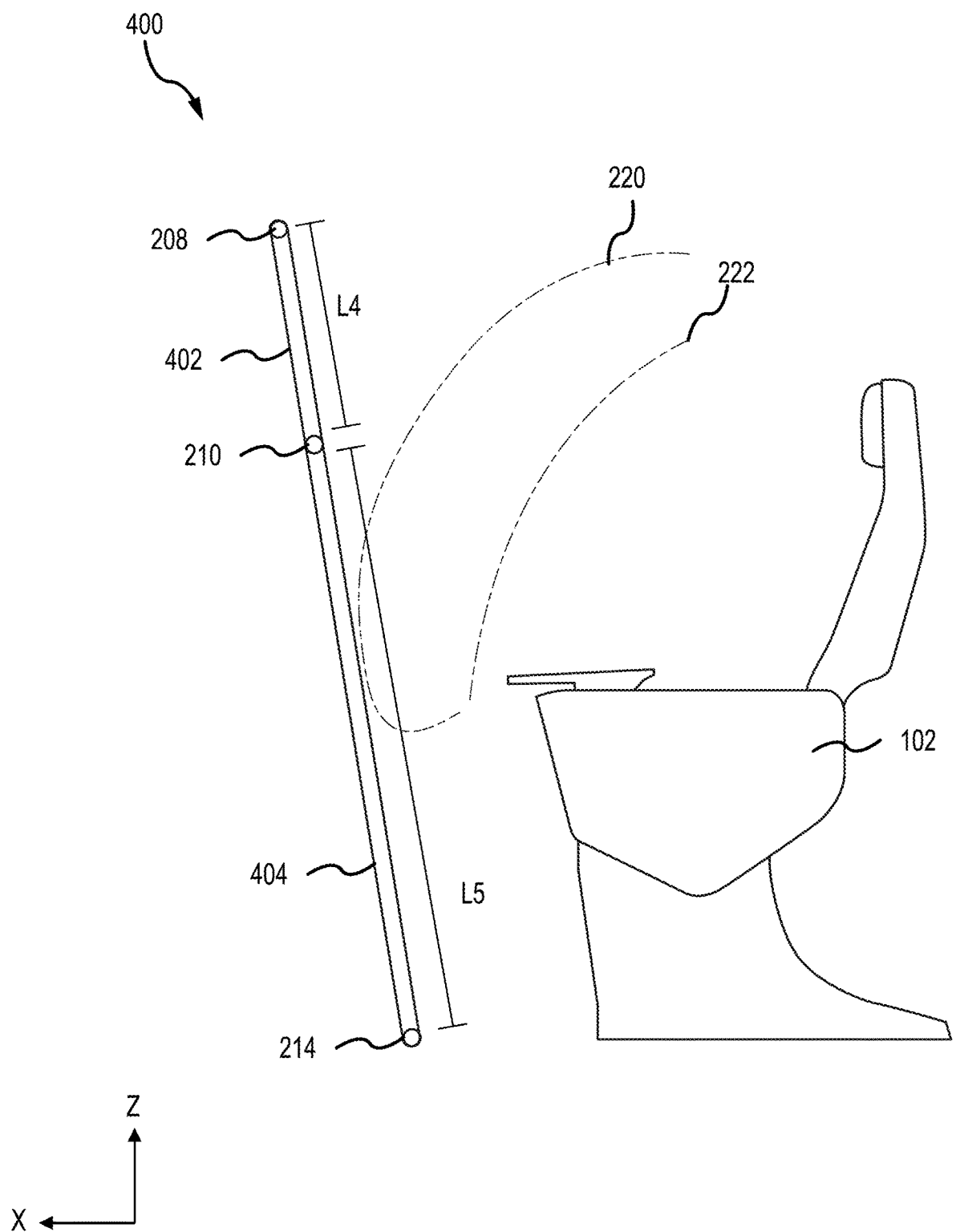
FIGS. 4A and 4B illustrate a movable area partition, in accordance with various embodiments.
Figure 4B:
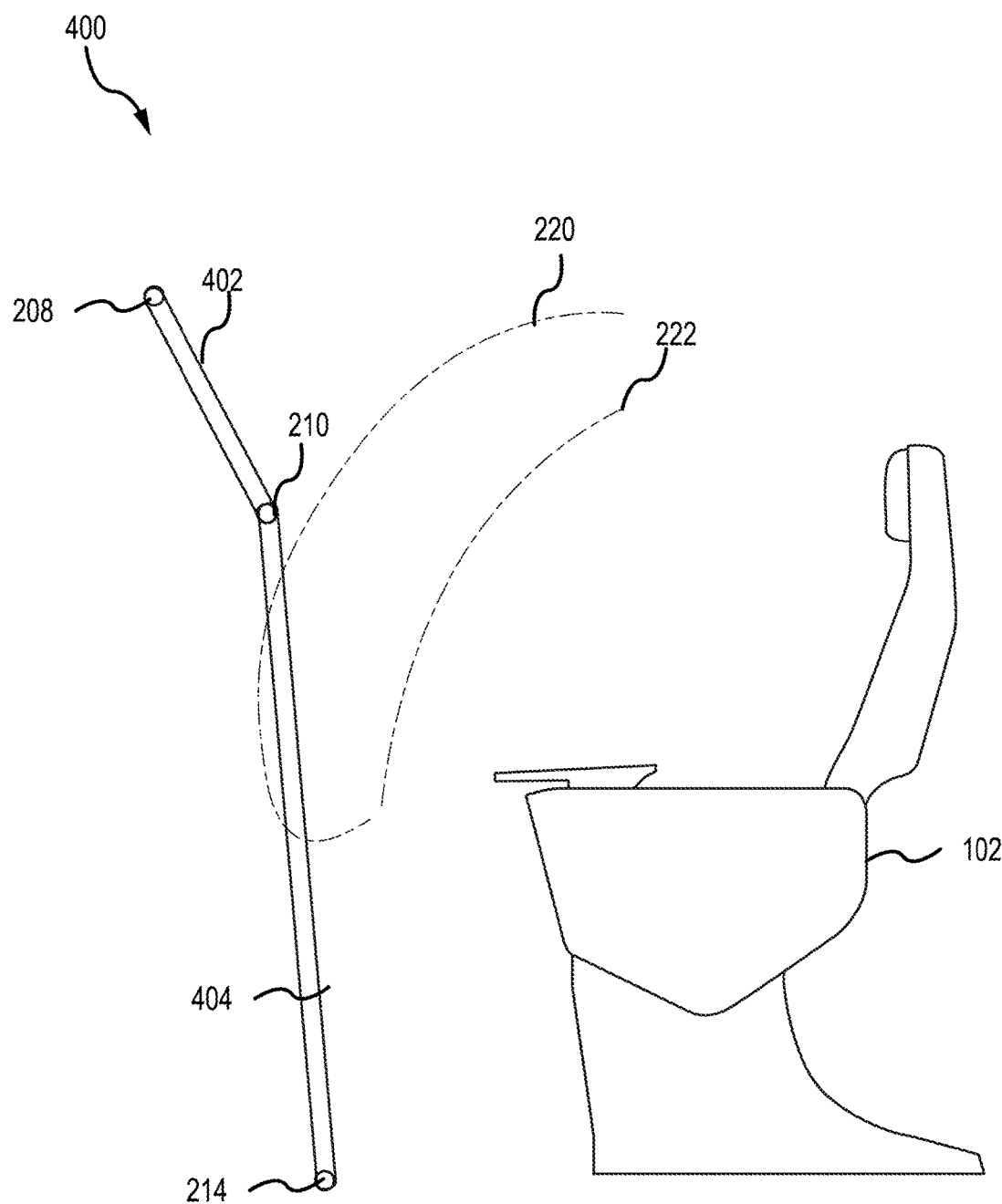

Referring now to FIGS. 4A and 4B, in accordance with various embodiments, a movable partition 400 is illustrated. Partition 400 may be an example of partition 106 described above with respect to FIG. 1A. Partition 400 includes similar components to those described above with respect to movable partition 200 in FIGS. 2A and 2B including connector 208, connector 214, top panel 402, and bottom panel 404. As such, components that are similar between movable partition 200 and partition 400 may not be described again below. Partition 400 may further include a locking mechanism similar to locking mechanism 300 including upper locking pins 302. FIG. 4A illustrates a side view of partition 400 in the taxi, take off, and landing (TTL) position, including TTL head strike arc 220 and in-flight limiting arc 222. FIG. 4B illustrates a side view of partition 400 in the in-flight position including TTL head strike arc 220 and in-flight limiting arc 222.

Partition 400 includes two panels (e.g., top panel 402 and bottom panel 404) instead of the three panels of movable partition 200. Connector 210 connects top panel 402 to bottom panel 404, as previously described with respect to movable partition 200. Top panel 402 has a length L4 that is about 8 inches (20.3 cm) to about 36 inches (91.4 cm). Bottom panel 404 has a length L5 that is about 24 inches (60.9 cm) to about 60 inches (152.4 cm). While top panel 402 and bottom panel 404 are depicted as being straight, in various embodiment top panel 402 and/or bottom panel 404 may be curved or have another shape. When partition 400 is in the TTL position, there is enough room between partition 400 and seat 102 to accommodate TTL head strike arc 220 according to regulations. When partition 400 is in the in-flight position, there is enough room between partition 400 and seat 102 to accommodate in-flight limiting arc 222 according to regulations.

In various embodiments, bottom panel 404 may additionally include an outer portion and an inner portion configured to slide with respect to the outer portion. That is, the inner portion may extend from the outer portion and retract into the outer portion. In this way, bottom panel 404 may extend to be longer or retract to be shorter depending on the angle between top panel 402 and bottom panel 404.

Figure 5A:
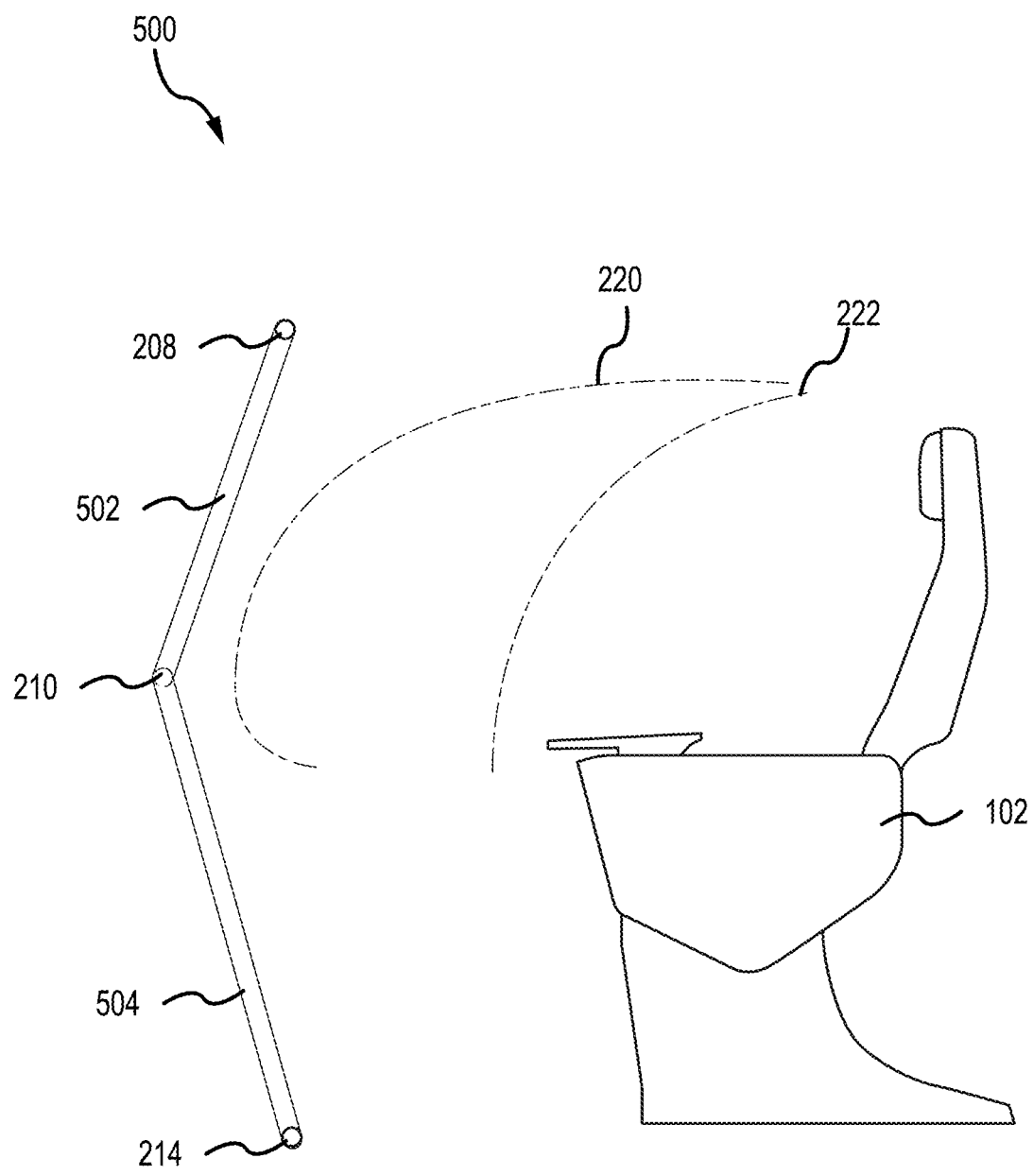
FIGS. 5A and 5B illustrate a movable area partition, in accordance with various embodiments.
Figure 5B:
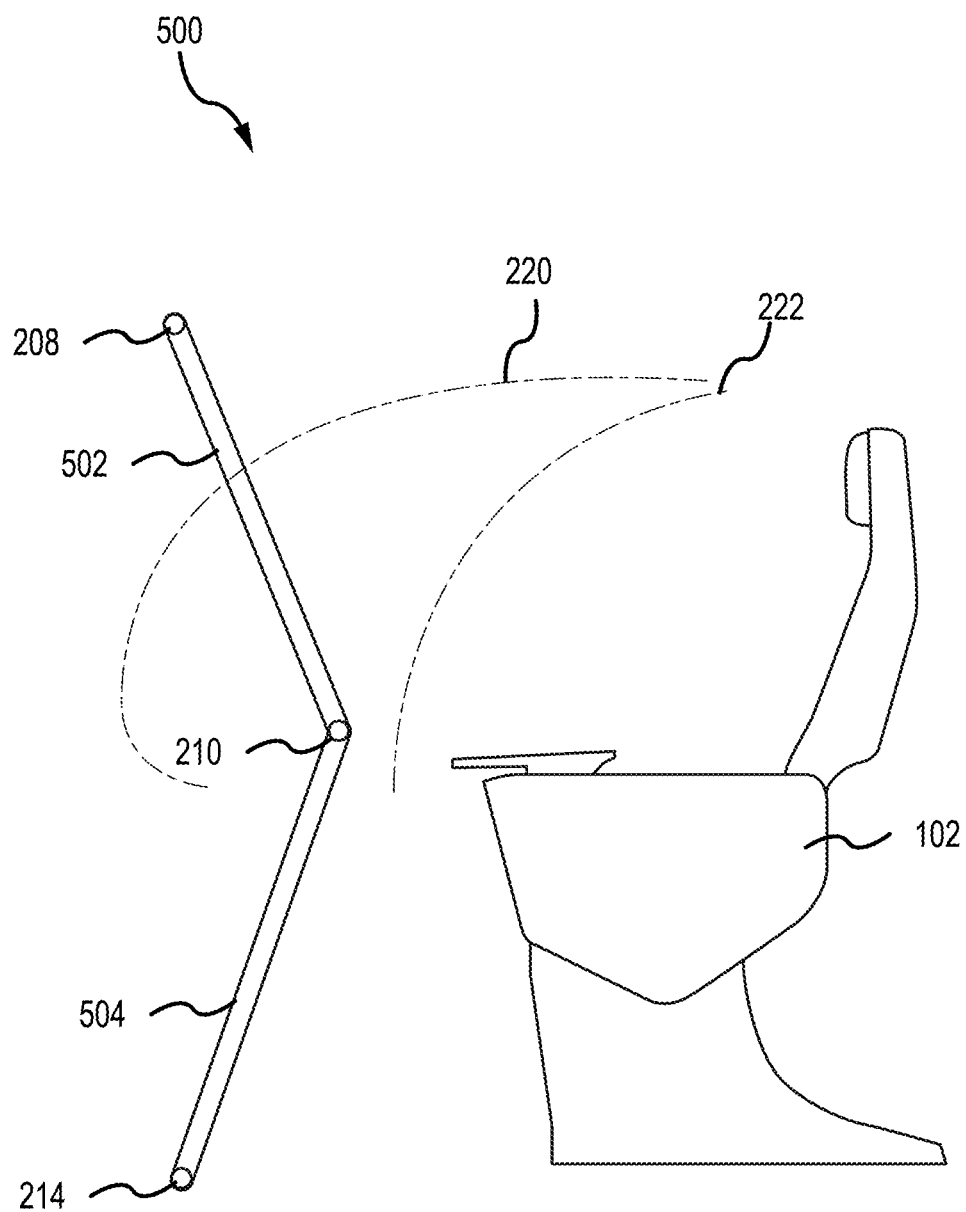

Referring now to FIGS. 5A and 5B, in accordance with various embodiments, a movable partition 500 is illustrated. Partition 500 may be an example of partition 106 described above with respect to FIG. 1A. Partition 500 includes similar components to those described above with respect to movable partition 200 in FIGS. 2A and 2B including connector 208, connector 214, top panel 502, and bottom panel 504. As such, components that are similar between movable partition 200 and partition 500 may not be described again below. Partition 500 may further include a locking mechanism similar to locking mechanism 300 including upper locking pins 302. FIG. 5A illustrates a side view of partition 500 in the taxi, take off, and landing (TTL) position, including TTL head strike arc 220 and in-flight limiting arc 222. FIG. 5B illustrates a side view of partition 500 in the in-flight position including TTL head strike arc 220 and in-flight limiting arc 222.

Partition 500 includes two panels (e.g., top panel 502 and bottom panel 504) instead of the three panels of movable partition 200. Connector 210 connects top panel 502 to bottom panel 504, as previously described with respect to movable partition 200. Top panel 502 has a length L6 that is about 24 inches (60.9 cm) to about 48 inches (121.9 cm). Bottom panel 504 has a length L7 that is about 24 inches (60.9 cm) to about 48 inches (121.9 cm). While top panel 502 and bottom panel 504 are depicted as being straight, in various embodiment top panel 502 and/or bottom panel 504 may be curved or have another shape. When partition 500 is in the TTL position, there is enough room between partition 500 and seat 102 to accommodate TTL head strike arc 220 according to regulations. When partition 500 is in the in-flight position, there is enough room between partition 500 and seat 102 to accommodate in-flight limiting arc 222 according to regulations.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A movable area partition for an aircraft cabin, comprising:
    a first connector coupled to a floor of the aircraft cabin;
    a second connector coupled to a ceiling of the aircraft cabin;
    a bottom panel having a first end and an opposing second end, the first end of the bottom panel pivotably coupled to the first connector;
    a top panel having a first end an opposing second end, the first end of the top panel rotatably coupled to the second end of the bottom panel and the second end of the top panel pivotably coupled to the second connector; and
    a middle panel having a first end and an opposing second end, first end of the middle panel rotatably coupled to the second end of the bottom panel and the second end of the middle panel rotatably coupled to the first end of the top panel.

2. The movable area partition of claim 1, wherein the bottom panel and the top panel rotate from a taxi, takeoff, and landing (TTL) position to an inflight position that is different than the TTL position.

3. The movable area partition of claim 1, further comprising:
    a locking mechanism including an upper locking pin, the upper locking pin configured to extend from within the bottom panel and into the top panel to lock first bottom panel and the top panel in a taxi, takeoff, and landing position.

4. The movable area partition of claim 1, further comprising:
a locking mechanism including an upper locking pin and a lower locking pin, the locking mechanism disposed within the middle panel, the upper locking pin configured to extend from the middle panel into the top panel to lock the movable area partition in a taxi, takeoff, and landing (TTL) position.

5. The movable area partition of claim 4, wherein the lower locking pin is configured to extend from the middle panel into the bottom panel to lock the movable area partition in an inflight position that is different than the TTL position.

6. The movable area partition of claim 4, wherein the middle panel and the top panel are colinear when locked in the TTL position.

7. An aircraft, comprising:
a floor;
a ceiling;
a galley;
a seat; and
a movable partition disposed between the galley and the seat and configured to move from taxi, take off, and landing (TTL) position and an inflight position, wherein there is a distance from the movable partition to the seat and the distance changes in response to the movement of the moveable partition, the movable partition including:
a first connector coupled to the floor;
a second connector coupled to the ceiling;
a bottom panel having a first end and an opposing second end, the first end coupled to the first connector; and
a top panel having a first end and an opposing second end, the first end of the top panel coupled to the second end of the bottom panel, the second end of the top panel coupled to the second connector.

8. The aircraft of claim 7, further comprising:
a floor attachment, wherein the first connector is coupled to the floor attachment.

9. The aircraft of claim 7, further comprising:
a partition support coupled to the ceiling, wherein the second connector is coupled to the partition support.

10. The aircraft of claim 7, wherein the movable partition further comprises:
a middle panel disposed between the bottom panel and the top panel, the middle panel coupled to the bottom panel and the top panel.

11. The aircraft of claim 10, wherein the top panel and the middle panel are colinear in the TTL position.

12. The aircraft of claim 11, wherein the bottom panel and the middle panel are colinear in the inflight position.

13. The aircraft of claim 10, further comprising:
a locking mechanism disposed within the middle panel, the locking mechanism including:
an upper locking pin;
a lower locking pin; and
a rod connected to the upper locking pin at a first end and the lower locking pin at an opposing second end.

14. The aircraft of claim 13, wherein the upper locking pin extends into the top panel in response to the rod moving in a first direction.

15. The aircraft of claim 14, wherein:
the lower locking pin extends into the bottom panel in response to the rod moving in a second direction that is opposite the first direction, and
the locking mechanism further includes a handle configured to move the rod in the first direction and the second direction.

16. A movable partition, comprising:
a bottom panel having a first end and a second end, the bottom panel pivotable about the first end, the first end of the bottom panel coupled to a floor;
a top panel having a first end and a second end, the top panel pivotable about the second end, the second end of the top panel coupled to a ceiling; and
a middle panel having a first end and an opposing second end, the first end of the middle panel rotatably coupled to the bottom panel and the second end of the middle panel rotatably coupled to the top panel,
wherein the movable partition is configured to move between a taxi, take off, and landing (TTL) position and an in-flight position, the bottom panel and the middle panel are colinear when the movable partition is in the first position, and the middle panel and the top panel are colinear when the movable partition is in the in-flight position.

17. The movable partition of claim 16, further comprising:
a locking mechanism disposed within the middle panel, the locking mechanism including a handle mechanically coupled to a first locking pin, the first locking pin configured to extend from the middle panel into the top panel in response to the handle moving in a first direction when the middle panel and the top panel are colinear.

18. The movable partition of claim 17, wherein the locking mechanism further includes a second locking pin mechanically coupled to the handle, the second locking pin configured to extend from the middle panel into the bottom panel in response to the handle moving in a second direction opposite the first direction when the middle panel the bottom panel are colinear.

19. The aircraft cabin of claim 1, further comprising the floor and the ceiling.

20. The movable area partition of claim 1, further comprising a plurality of panels, the plurality of panels consisting of the bottom panel, the top panel, and the middle panel.

* * * * *